(12) United States Patent
Baudasse et al.

(10) Patent No.: US 11,591,116 B2
(45) Date of Patent: Feb. 28, 2023

(54) DEPLOYABLE TAPE SPRING DEVICE HAVING A ROLLABLE MEMBRANE AND CASING, AND SATELLITE INCLUDING THE SAME

(71) Applicant: THALES, Courbevoie (FR)

(72) Inventors: Yannick Baudasse, Cannes la Bocca (FR); Stéphane Vezain, Cannes la Bocca (FR)

(73) Assignee: THALES, Courbevoie (FR)

( * ) Notice: Subject to any disclaimer, the term of this patent is extended or adjusted under 35 U.S.C. 154(b) by 286 days.

(21) Appl. No.: 17/024,064

(22) Filed: Sep. 17, 2020

(65) Prior Publication Data

US 2021/0086919 A1 Mar. 25, 2021

(30) Foreign Application Priority Data

Sep. 19, 2019 (FR) ........................................ 1910313

(51) Int. Cl.
*B64G 1/22* (2006.01)
*B65H 16/06* (2006.01)

(52) U.S. Cl.
CPC ............. *B64G 1/222* (2013.01); *B65H 16/06* (2013.01)

(58) Field of Classification Search
CPC ................................. B64G 1/222; B64H 16/06
See application file for complete search history.

(56) References Cited

U.S. PATENT DOCUMENTS

| 4,636,579 | A | 1/1987 | Hanak et al. |
| 5,605,769 | A | 2/1997 | Toms |
| 9,156,568 | B1 | 10/2015 | Spence et al. |
| 2005/0178921 | A1* | 8/2005 | Stribling ................ B64G 1/222 244/172.7 |
| 2017/0021947 | A1 | 1/2017 | Pellegrino et al. |
| 2017/0297749 | A1* | 10/2017 | Steele .................... B64G 1/222 |
| 2018/0244405 | A1* | 8/2018 | Brown ............... B65H 75/4486 |
| 2019/0039757 | A1* | 2/2019 | Beck ......................... B60P 7/16 |
| 2019/0383014 | A1* | 12/2019 | Turse .................... B64G 1/222 |

FOREIGN PATENT DOCUMENTS

EP 2 471 714 A1 7/2012
EP 3 012 193 A1 4/2016

* cited by examiner

*Primary Examiner* — Brady W Frazier
*Assistant Examiner* — Shanna Danielle Glover
(74) *Attorney, Agent, or Firm* — BakerHostetler

(57) ABSTRACT

A deployable device includes a supporting structure, a mandrel able to move in rotation with respect to the supporting structure about a first axis Z, a membrane able to pass from a rolled-up configuration rolled up around the mandrel about the first axis Z to a deployed configuration deployed along a second axis X substantially perpendicular to the first axis Z. The device comprises two fittings secured to the mandrel at their centre, arranged one on either side of the membrane and comprising first stubs on their periphery, a casing extending between the two fittings, the casing comprising second stubs of a shape complementing the shape of the first stubs, the casing being able to pass from a rolled-up configuration at least partially enveloping the membrane in the rolled-up configuration to a deployed configuration at least partially superposed on the membrane in the deployed configuration.

10 Claims, 4 Drawing Sheets

DEPLOYABLE TAPE SPRING DEVICE HAVING A ROLLABLE MEMBRANE AND CASING, AND SATELLITE INCLUDING THE SAME

CROSS-REFERENCE TO RELATED APPLICATIONS

This application claims priority to foreign French patent application No. FR 1910313, filed on Sep. 19, 2019, the disclosure of which is incorporated by reference in its entirety.

FIELD OF THE INVENTION

The present invention relates to a deployable device for tape springs. It relates in particular to the field of space equipment for which structures need to be deployed in orbit and, more specifically, to space equipment for satellites, such as solar generators, heat screens. However, the invention is applicable to any other field that entails deploying a structure.

BACKGROUND

In the field of space, tape springs are often used in deployment. In the stored (or rolled-up) position, tape springs are rolled up around a mandrel. Deployment of tape springs occurs autonomously as they spontaneously unroll when the mandrel is free to rotate. Spring tapes are known in the field of space as being flexible tapes having a cross section in the form of an arc of a circle of which the radius of curvature is convex on a first face and concave on a second face, these tapes being able to pass from the rolled-up state to the deployed state essentially by virtue of their own elastic energy. There are various types of tape that each have their own properties. Monostable tapes have a deployed natural position and require retention to hold them in the stored position. Monostable tape springs therefore have a natural tendency to deploy in order to return to their unrolled state. The deployment of monostable tapes is often haphazard and uncontrolled. Bistable tapes have two natural positions (rolled-up position and deployed position). Their deployment is linear and controlled.

Where there is a wish to deploy a structure using tape springs, it is necessary for the tape springs to hold the object in the rolled-up configuration and maintain the rigidity of the assembly during deployment. The mandrel may be connected to the bearing structure at its ends. That makes it possible to optimize the useful surface area, for example of the membrane rolled up around the mandrel and on which solar cells are arranged. It also makes it possible to minimize interfaces for catching on the bearing structure. This type of configuration meets the requirements associated with deployable devices, which are connected with the problems of compactness and rigidity in the stored configuration and optimization of onboard mass.

In the configuration known from the prior art, in which configuration the mandrel is connected to the bearing structure at its ends, the mandrel has to be able to react all the loads of launch. Because its diameter is limited by the constraint of available storage volume, the load-reacting capabilities of the mandrel are also limited.

This becomes particularly problematical in the case of large deployable structures which require greater launch loads.

In order to address this problem, existing solutions are based on the addition of stowage on the central part of the mandrel. For example, a stowage band is connected to the mandrel to contribute to reacting the loads. Depending on the size of the deployable structure, there may also be two or three stowage bands. This results in a reduction in the useful surface area. Furthermore, the addition of additional stowage has an impact on the performance of the structure in terms of the onboard mass and the frequency in the deployed configuration. Finally, additional stowage may also present a risk of nondeployment of the structure.

SUMMARY OF THE INVENTION

The invention seeks to alleviate all or some of the abovementioned problems by proposing a tape spring deployable device that is robust, compact and rigid in the rolled-up configuration, capable of reacting high launch loads, and at the same time guarantees a maximum useful surface area, and is able to deploy a structure of large size.

To this end, one subject of the invention is a deployable device comprising a supporting structure, a mandrel able to move in rotation with respect to the supporting structure about a first axis Z, a membrane able to pass from a rolled-up configuration rolled up around the mandrel about the first axis Z to a deployed configuration deployed along a second axis X substantially perpendicular to the first axis Z. According to the invention, the deployable device comprises two fittings secured to the mandrel at their centre, arranged one on either side of the membrane and comprising first stubs on their periphery, a casing extending between the two fittings, the casing comprising second stubs of a shape complementing the shape of the first stubs, the casing being able to pass from a rolled-up configuration at least partially enveloping the membrane in the rolled-up configuration to a deployed configuration at least partially superposed on the membrane in the deployed configuration.

Advantageously, the casing is made up of a skin made of composite materials.

Advantageously, the casing comprises at least one reinforcement substantially parallel to the first axis Z.

Advantageously, the casing comprises at least one flexible printed circuit and/or electronic components.

The invention also relates to a deployable assembly comprising such a deployable device and two tape springs positioned one on either side of the membrane and connected to the membrane, each being able to pass from a rolled-up configuration rolled up around the first axis Z when the deployable device is in the rolled-up configuration to a deployed configuration deployed along the second axis X when the deployable device is in the deployed configuration.

Advantageously, the membrane extends between the two tape springs.

Advantageously, the deployable assembly further comprises at least one reinforcement extending between the two tape springs and able to connect the membrane to the tape springs.

Advantageously, the casing is connected to the two tape springs.

Advantageously, the deployable assembly comprises a roller configured to press against the casing in the rolled-up configuration.

The invention also relates to a satellite comprising at least one such deployable assembly.

DESCRIPTION OF THE FIGURES

The invention will be better understood and further advantages will become apparent from reading the detailed description of one embodiment which is given by way of example, which description is illustrated by the attached drawing in which.

DETAILED DESCRIPTION OF THE INVENTION

For the sake of clarity, in the various figures, the same elements will bear the same references.

The invention applies to monostable or bistable tape springs. The use of monostable tape springs requires greater guide effort. Bistable tape springs are preferred on account of the uniformity of their deployment. In addition, in the rolled-up configuration, they remain rolled up, and in the deployed configuration, they remain deployed.

Furthermore, the invention is described in the nonlimiting example of a deployment on a satellite, but it is applicable to any other field requiring the deployment of a structure.

Figure 1:
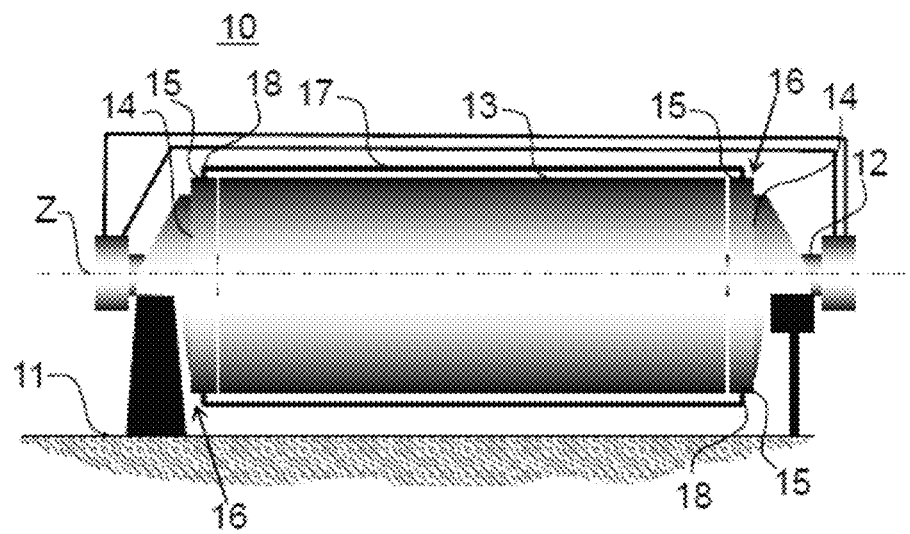
FIG. 1 schematically depicts a deployable device in the rolled-up configuration according to the invention.

FIG. 1 schematically depicts a deployable device 10 in the rolled-up configuration according to the invention. The deployable device 10 comprises a supporting structure 11, for example the bearing structure, for example the body shell of the satellite. It also comprises a mandrel 12 able move in rotation with respect to the supporting structure 11 about a first axis Z. The mandrel 12 may be connected to the supporting structure by a fixed structure, or else by means of two legs, for example a tripod and a blade, during the phase of launch of the satellite and released from the supporting structure 11 thereafter.

The deployable device comprises a membrane 13 able to pass from a rolled-up configuration rolled up around the mandrel about the first axis Z to a deployed configuration deployed along a second axis X substantially perpendicular to the first axis Z. This membrane 13 may be equipped with solar cells distributed over its surface.

According to the invention, the deployable device 10 comprises two fittings 14 secured to the mandrel 12 substantially at their centre, arranged one on either side of the membrane 13 and comprising first stubs 15 on their periphery 16, and a casing 17 extending between the two fittings 14, the casing 17 comprising second stubs 18 of a shape complementing the shape of the first stubs 15, the casing 17 being able to pass from a rolled-up configuration at least partially enveloping the membrane 13 in the rolled-up configuration to a deployed configuration at least partially superposed on the membrane 13 in the deployed configuration. The two fittings 14 are advantageously secured to the stowage legs in the launch configuration, which constitute points of contact of the deployable device 10 when it is folded up during the launch phase. The casing 17 forms, for the membrane 13, an external mandrel with very high inertia, and enveloping the membrane 13. Thus, the casing 17 reacts the launch loads. As depicted in the figures, the fittings 14 are advantageously circular in shape. Other shapes are also possible, for example elliptical, although the circular shape remains the shape that is the most beneficial for the rolling-up of the casing 17 and in terms of the space that it occupies in the rolled-up configuration.

In the case of circular fittings 14, the first stubs 15 are situated on their periphery 16, namely on the perimeter of the fittings, oriented towards the outside of the fitting in order to face the second stubs 18 of the casing 17. The first stubs 15 and the second stubs 18 have complementary shapes so as to engage with one another. The term stub is to be understood in the broadest sense, and the second stubs 18 can also be perforations into which the first stubs 15 become inserted when the casing 17 is rolled up. To mention another example, the second stubs 18 of the casing 17 may be pins, advantageously conical pins, and the first stubs 15 of the fittings 14 may be grooves. When the casing 17 is in the rolled-up configuration, the pins of the casing 17 are inserted into the grooves of the fittings. Thus, the casing 17 is held in the rolled-up position rolled up around the mandrel 12. As the casing deploys, the pins of the casing slide along the grooves of the fittings and separate therefrom, and in the deployed configuration of the casing, the pins are completely separated from the grooves. The assembly of the first stubs 15 and of the second stubs 18 can also be an adherent connection involving, on the one hand, protuberances and, on the other hand, loops of filament. In other words, in this latter alternative form of stubs forming an adherent connection, the first stubs 15 and the second stubs 18 are adherent elements.

Figure 2:
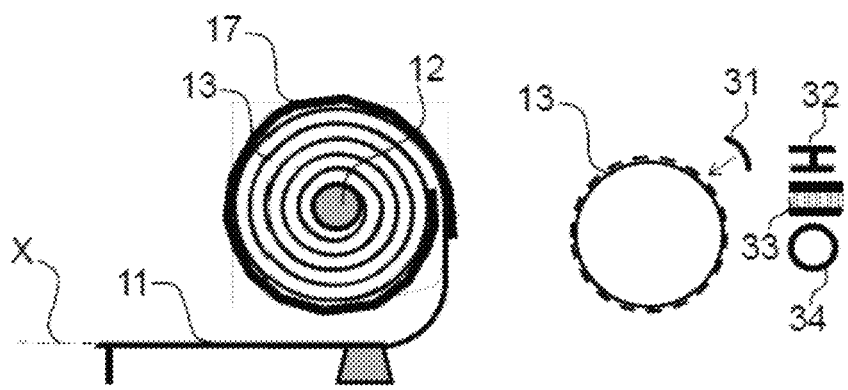
FIG. 2 schematically depicts a view in cross section of a deployable device according to the invention.

FIG. 2, in the left-hand part, schematically depicts a view in cross section of a deployable device 10 according to the invention. The casing 17 completely envelops the membrane 13 on the outside. The casing 17 may also partially envelope the membrane 13, namely envelope it over a portion of the exterior surface of the membrane 13 in the rolled-up configuration. Advantageously, the casing 17 envelopes the membrane 13 over its entire exterior surface (as depicted in the figure). The casing 17 may also envelope the membrane 13 over several turns, being superposed thereon. This latter configuration allows better reaction of the launch loads.

Figure 5:
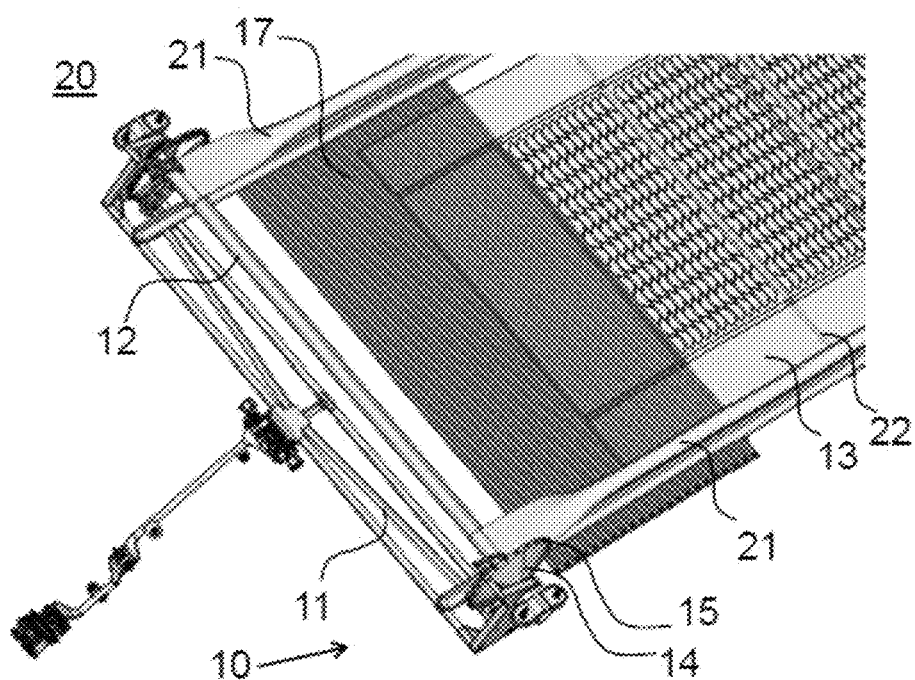
FIG. 5 schematically depicts a deployable assembly in the deployed configuration according to the invention.

As visible in FIG. 5, the casing 17 in the deployed configuration covers part of the membrane 13. This part covered by the casing 17 still cannot be used as useful surface area for the positioning of solar cells. There is therefore a compromise to be reached between the length of the casing 17 (that is to say the number of turns effected) and the useful surface area that is not directly usable.

The casing 17 is made up of a skin made of composite materials. Of the composite materials that can form the casing, mention may be made of glass fibre, carbon fibre (which is appreciated for its stiffness and its lightness of weight), or a polymer from the polyaryletherketone (PAEK) polymer family, preferentially a polymer of the polyetheretherketone (PEEK) type. Polyaryletherketones are a family of technical thermoplastic polymers with good thermomechanical properties. Polyetheretherketone is highly thermostable. Mention may also be made of polyimide, a polymer based on imide, which is thermostable in a wide temperature range (for example −200 to +200° C.) which is compatible with use in the field of space. It may for example be Kapton (a film of polyimide) which may or may not be reinforced.

The casing 17 is advantageously produced in the form of a grating or of a net. It may be a knitted structure.

The assembly formed by the casing 17 and the fittings 14 to which the casing 17 is fixed in the rolled-up configuration is able to react tensile-compressive loads during launch.

As depicted schematically in the right-hand part of FIG. 2, the membrane 13 may also support a multitude of slats of varying shapes, such as a sector of a cylinder 31, an H-shaped cross section 32, a honeycomb 33, a tube 34, etc.

Figure 3:
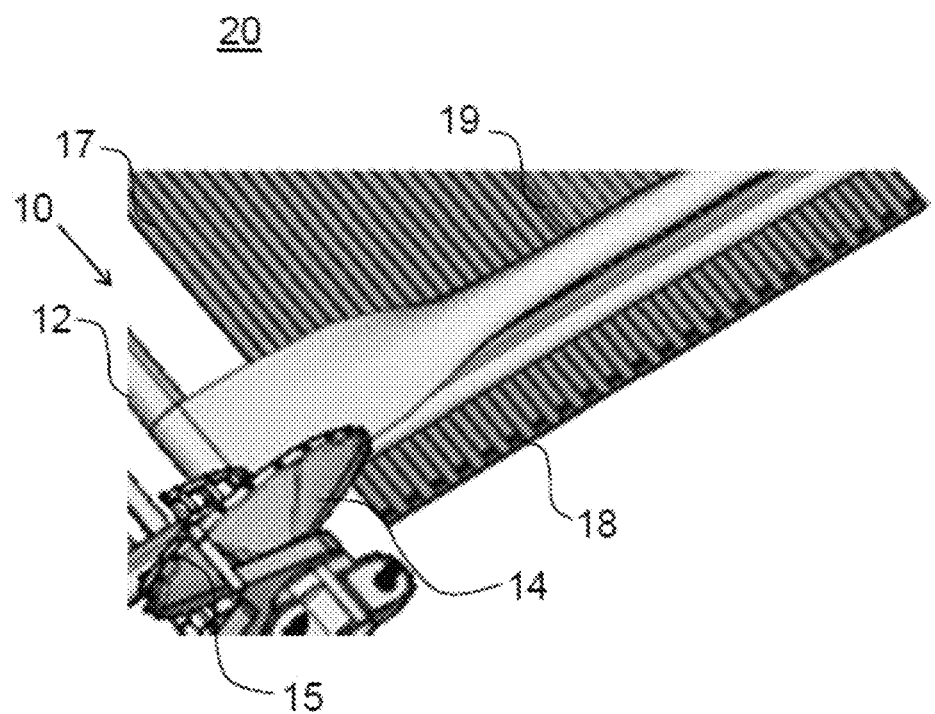
FIG. 3 schematically depicts part of a deployable assembly in the deployed configuration according to the invention.

FIG. 3 schematically depicts part of a deployable assembly 20 in the deployed configuration according to the invention.

As may be seen, the casing 17 may comprise at least one reinforcement 19 substantially parallel to the first axis Z, which is able to reinforce the mesh work or grating that forms the casing 17.

The deployable assembly 20 comprises a deployable device 10 and two tape springs 21 positioned one on either side of the membrane 13 and connected to the membrane, each being able to pass from a rolled-up configuration rolled up around the first axis Z when the deployable device 10 is in the rolled-up configuration to a deployed configuration deployed along the second axis X when the deployable device 10 is in the deployed configuration.

In one advantageous embodiment, the casing 17 is connected to the two tape springs 21. Deployment of the tape springs 21 allows simultaneous deployment of the casing 17.

Figure 4:
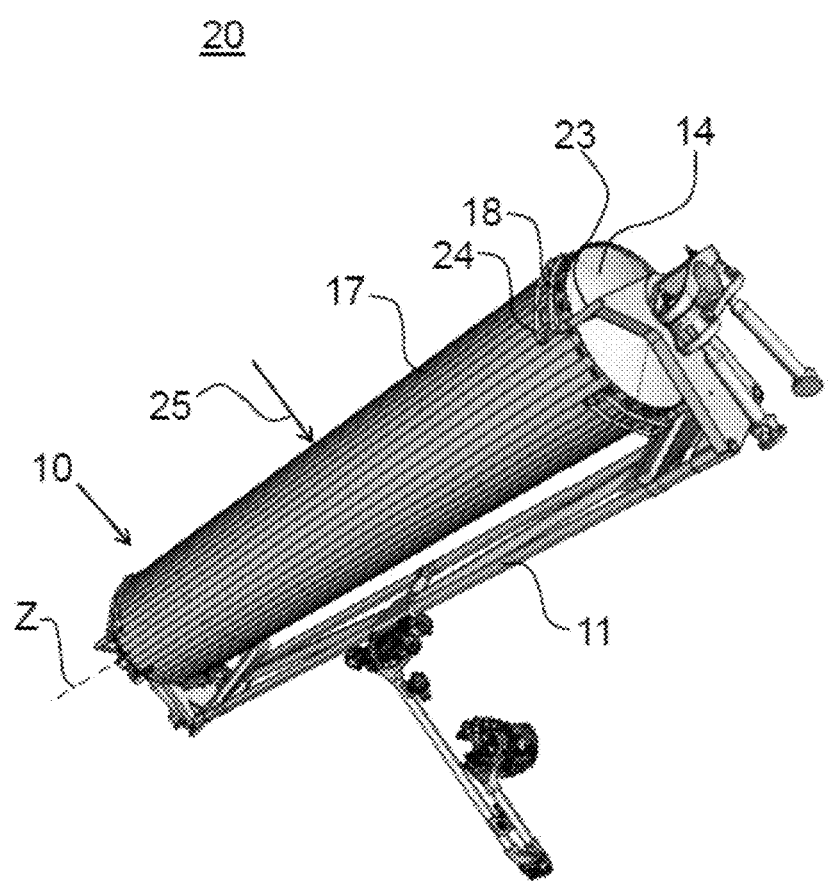
FIG. 4 schematically depicts a deployable assembly in the rolled-up configuration according to the invention.

FIG. 4 schematically depicts a deployable assembly 20 in the rolled-up configuration according to the invention. In the region of the fittings 14, there may be seen in this rolled-up configuration of the deployable device 10 the first stubs 15 of a shape complementing the second stubs 18 of the casing 17 which engage with one another to keep the casing 17 in the rolled-up position rolled up around the fittings 14 and therefore around the membrane 13, in order to envelope same. The first stubs 15 of the fittings are protuberances and the second stubs 18 of the casing 17 are orifices configured to accept the protuberances and hold them in position in the orifices. The reverse may also be envisaged: the first stubs 15 may be orifices and the second stubs 18 may be protuberances. In this case, if the casing 17 is wrapped around itself a number of times in the rolled-up configuration, the size of the protuberances (second stubs 18) needs to be designed to superpose with the orifices (first stubs 15) of the fittings 14. The casing 17 thus forms an external mandrel for the membrane 13.

The deployable device 10 may further comprise a guide system guiding the casing 17. The guide system is made up of a spring 23 and of an area contact 24. The area contact 24 is mounted on the spring 23 and the spring is connected to the supporting structure 11. The area contact 24 at least partially surrounds the casing 17 in the rolled-up configuration. Advantageously, the deployable device 10 comprises two guide systems, one at each end of the casing 17. The guide system guarantees that the casing 17 is suitably compact in the rolled-up position.

The deployable device 10 may also comprise a roller 25 configured to press against the casing 17 in the rolled-up configuration. Advantageously, the roller 25 is central. Such a roller 25 can be obtained using a means known to those skilled in the art, for example a finger pressing against the casing 17, the finger being connected to an arm itself connected to the supporting structure 11. For solar generators 5 to 6 metres wide, the casing 17 may for example measure 10 metres in length. The roller 25 pressing against the casing 17 limits the travel and bending of the assembly. The roller 25 forms a point contact.

FIG. 5 schematically depicts a deployable assembly 20 in the deployed configuration according to the invention. The deployable assembly 20 may further comprise at least one reinforcement 22 extending between the two tape springs 21 and able to connect the membrane 13 to the tape springs 21.

The tape springs 21 act as a support for the membrane 13 and allow it to pass from its rolled-up configuration to its deployed configuration.

The membrane 13 may be arranged between the two tape springs 21, as can be seen in FIG. 5, and connected to the tape springs 21 via the reinforcements 22, but it may also extend beyond the tape springs 21, with or without reinforcements 22.

The casing 17 may also comprise at least one flexible printed circuit and/or electronic components. The presence of a printed circuit and/or electronic components provides an electrical connection between the membrane 13 which is intended to supply the electrical energy from its solar cells, and the satellite.

The invention offers numerous advantages. Through its design, the deployable assembly is reversible and can be reused as many times as desired. The casing 17 provides rigidity when the assembly is in the rolled-up configuration, while at the same time keeping it compact and optimized in terms of mass. The casing 17 is able to react the loads of launch without the additional addition of further stowage, thereby making it possible to keep almost all of the area as useful surface area.

Figure 6:
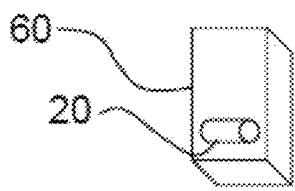
FIG. 6 schematically depicts a satellite comprising a deployable assembly according to the invention.

FIG. 6 schematically depicts a satellite 60 comprising a deployable assembly 20 according to the invention. Just one single deployable assembly 20 is depicted in FIG. 6. A satellite 60 may comprise several of these, on various faces of the satellite or on the one same face, depending on the space available. In FIG. 6, the deployable assembly 20 is depicted in the rolled-up configuration, with the membrane 13 and the casing 17 rolled up around the mandrel 12.

The invention claimed is:

1. A deployable device comprising:
   a supporting structure,
   a mandrel able to move in rotation with respect to the supporting structure about a first axis (Z), the mandrel being connected to the supporting structure by a fixed structure,
   a membrane able to pass from a rolled-up configuration rolled up around the mandrel about the first axis (Z) to a deployed configuration deployed along a second axis (X) substantially perpendicular to the first axis (Z),
   the deployable device further comprising:
   two circular fittings secured to the mandrel at their centre, arranged one on either side of the membrane and comprising first stubs on the perimeter of the fittings,
   a casing extending between the two fittings, the casing comprising second stubs of a shape complementing the shape of the first stubs, the casing being able to pass from a rolled-up configuration in which the casing is rolled up around the perimeter of the fittings at least partially enveloping the membrane in the rolled-up configuration in which the second stubs are inserted in the first stubs on the perimeter of the fittings to a deployed configuration at least partially superposed on the membrane in the deployed configuration.

2. The deployable device according to claim 1, wherein the casing is made up of a skin made of composite materials.

3. The deployable device according to claim 1, wherein the casing comprises at least one reinforcement substantially parallel to the first axis (Z).

4. The deployable device according to claim 1, wherein the casing comprises at least one flexible printed circuit and/or electronic components.

5. A deployable assembly comprising:
   a deployable device according to claim 1, two tape springs positioned one on either side of the membrane and connected to the membrane, each being able to pass from a rolled-up configuration rolled up around the first axis (Z) when the deployable device is in the rolled-up configuration to a deployed configuration deployed along the second axis (X) when the deployable device is in the deployed configuration.

6. The deployable assembly according to claim 5, wherein the membrane extends between the two tape springs.

7. The deployable assembly according to claim 5, further comprising at least one reinforcement extending between the two tape springs and able to connect the membrane to the tape springs.

8. The deployable assembly according to claim 5, wherein the casing is connected to the two tape springs.

9. The deployable assembly according to claim 5, comprising a roller configured to press against the casing in the rolled-up configuration.

10. A satellite comprising at least one deployable assembly according to claim 5.

* * * * *